US008380797B2

(12) United States Patent
Eckardt (10) Patent No.: US 8,380,797 B2
(45) Date of Patent: Feb. 19, 2013

(54) BUSINESS DATA EXCHANGE LAYER (75) Inventor: Cheryl Eckardt, Shelton, CT (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 12/614,681

(22) Filed: Nov. 9, 2009

(65) Prior Publication Data

US 2011/0113105 A1  May 12, 2011

(51) Int. Cl.
G06F 15/16 (2006.01)
(52) U.S. Cl. .......................... 709/206; 709/225
(58) Field of Classification Search .......... 709/204–206, 709/225
See application file for complete search history.

(56) References Cited

U.S. PATENT DOCUMENTS

| 7,036,072 | B1* | 4/2006 | Sulistio et al. ................. 715/205 |
| 7,058,886 | B1* | 6/2006 | Sulistio et al. ................. 715/235 |
| 7,237,191 | B1* | 6/2007 | Sulistio et al. ................. 715/246 |
| 7,278,096 | B2* | 10/2007 | Sulistio et al. ................. 715/234 |
| 7,415,669 | B1* | 8/2008 | Davidson et al. ............. 715/234 |
| 2002/0138166 | A1 | 9/2002 | Mok et al. |
| 2003/0145058 | A1* | 7/2003 | Chan et al. .................... 709/206 |
| 2006/0031325 | A1* | 2/2006 | Cheng ............................ 709/206 |
| 2006/0156224 | A1* | 7/2006 | Sulistio et al. ................. 715/513 |
| 2006/0230075 | A1 | 10/2006 | Greef et al. |
| 2007/0206773 | A1* | 9/2007 | Branam .................... 379/265.09 |
| 2008/0301544 | A1* | 12/2008 | Davidson et al. ............. 715/234 |
| 2008/0320548 | A1* | 12/2008 | Tripathi et al. .................... 726/1 |
| 2009/0113002 | A1* | 4/2009 | Zellner et al. ................. 709/206 |
| 2009/0132912 | A1* | 5/2009 | Sulistio et al. ................. 715/236 |
| 2009/0138972 | A1* | 5/2009 | Scales .............................. 726/24 |
| 2009/0327961 | A1* | 12/2009 | De Vorchik et al. .......... 715/825 |
| 2010/0146050 | A1* | 6/2010 | Grieder et al. ................ 709/204 |
| 2010/0235176 | A1* | 9/2010 | Chen et al. ..................... 705/1.1 |
| 2010/0241711 | A1* | 9/2010 | Ansari et al. .................. 709/205 |
| 2010/0299161 | A1* | 11/2010 | Burdick et al. .................... 705/4 |
| 2010/0306179 | A1* | 12/2010 | Lim .............................. 707/688 |
| 2011/0035581 | A1* | 2/2011 | Maller .......................... 713/152 |
| 2011/0083111 | A1* | 4/2011 | Forutanpour et al. .......... 715/863 |

* cited by examiner

*Primary Examiner* — Patrice Winder
*Assistant Examiner* — Julian Chang
(74) *Attorney, Agent, or Firm* — Buckley, Maschoff & Talwalkar LLC (57) ABSTRACT

According to some embodiments, an account may be established for a user, and the account may be associated with a set of authorized combination identifiers, each authorized combination identifier including an authorized sending device identifier, an authorized destination device identifier, and an authorized file type identifier. A dynamically generated list of notification options may be displayed to the user, each option being associated with one of the authorized combination identifiers. The user may then select a notification option for each of the authorized combination identifiers. In addition, a business file may be received along with a received combination identifier that includes a sending device identifier associated with the sending device, a destination device identifier, and a file type identifier associated with the business file. Based on the received combination identifier, the business file may be forwarded to a destination device associated with the destination device identifier; and a notification message may be transmitted to the user based on the selected notification option associated with the received combination identifier.

20 Claims, 9 Drawing Sheets

BUSINESS DATA EXCHANGE LAYER

BACKGROUND

In some systems, a user may need to transfer a business file to one or more receiving systems associated with an enterprise. For example, a user associated with a first business system may need to send a financial data file (e.g., a spreadsheet or other type of financial data file) to an accounting system on a periodic basis (e.g., on a weekly or quarterly basis). Note that many different users may need to send different types of business files to various receiving systems within the enterprise.

A user might need to determine if an error occurred in connection with a business file that he or she attempted to send. A user might also be interested in confirming that a particular business file was, in fact, successfully received. It can be a time consuming and error prone process to have individual users follow-up on the status of individual business files, especially when there are a significant number of senders, receivers, and/or type of files.

Moreover, it may be helpful to let one or more users track the flow of information throughout an enterprise in a timely and efficient manner. For example, a group manager might want to review the dates on which various financial documents were submitted to an accounting system. Note that governmental laws and regulations might, in some cases, require that the flow of information be tracked within an enterprise. It can be difficult, however, for a user to collect and interpret information about a large number of business files.

SUMMARY

According to some embodiments, an account may be established for a user, and the user account may be associated with a set of authorized combination identifiers, each authorized combination identifier including: (i) an authorized sending device identifier, (ii) an authorized destination device identifier, and (iii) an authorized file type identifier. A dynamically generated list of notification options may be displayed to the user, each option being associated with one of the authorized combination identifiers, and a selected notification option may be received from the user for each of the authorized combination identifiers. A business file may be received from a sending device along with a received combination identifier that includes all of: (i) a sending device identifier associated with the sending device, (ii) a destination device identifier, and (iii) a file type identifier associated with the business file. Based on the received combination identifier, the business file may be forwarded to a destination device associated with the destination device identifier, and a notification message may be transmitted to the user based on the selected notification option.

Other embodiments may include: means for establishing an account for a user, the user account being associated with a set of authorized combination identifiers, wherein each authorized combination identifier includes all of (i) an authorized sending device identifier, (ii) an authorized destination device identifier, and (iii) an authorized file type identifier; means for displaying to the user a dynamically generated list of notification options, each option being associated with one of the authorized combination identifiers; means for receiving from the user a selected notification option for each of the authorized combination identifiers; means for receiving, from a sending device via the communication device, a business file, wherein the business file is received along with a received combination identifier that includes all of (i) a sending device identifier associated with the sending device, (ii) a destination device identifier, and (iii) a file type identifier associated with the business file; means for forwarding, based on the received combination identifier, the business file to a destination device associated with the destination device identifier; and means for transmitting, based on the selected notification option associated with the received combination identifier, a notification message to the user.

A technical effect of some embodiments of the invention is an improved and automated ability to share and exchange business information within an enterprise. With this and other advantages and features that will become hereinafter apparent, a more complete understanding of the nature of the invention can be obtained by referring to the following detailed description and to the drawings appended hereto.

DETAILED DESCRIPTION

Figure 1:
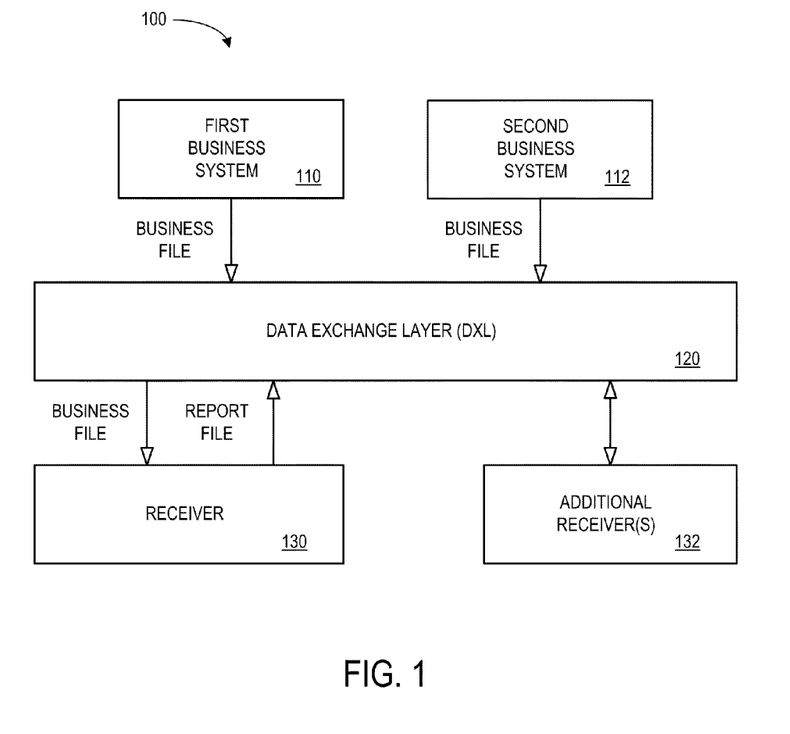
FIG. 1 is a block level diagram of a system according to some embodiments.

To address some of the problems described in the background section of this application, a business data exchange layer application and/or apparatus may be provided. For example, FIG. 1 is block diagram of a system 100 in accordance with some embodiments. In particular, a data exchange layer 120 may exchange information with a number of remote business systems 110, 112. The data exchange layer 120 may also exchange data with one or more remote receivers 130, 132. As used herein, a device may be "remote" from the data exchange layer 120 in that it is physically located distant from the data exchange layer 120 and/or in that it communicates with the data exchange layer 120 via one or more communication networks. The data exchange layer 120, business systems 110, 112, and receiver 130 may then operate in accordance with any of the embodiments described herein.

According to some embodiments, the data exchange layer 120, business systems 110, 112, and receiver 130 facilitate an automated transfer of business information and/or files. As used herein the term "automated" indicates that at least some part of a step associated with a process or service is performed with little or no human intervention. By way of examples only, the business systems 110, 112 might be associated with a Personal Computer (PC), a notebook computer, a workstation, and/or a Personal Digital Assistant (PDA). The data exchange layer 120 and/or receiver 130 might be associated with, for example, a server, an enterprise application, and/or a database.

Any of the devices described in connection with the system 100 might, according to some embodiments, exchange information via a communication network. As used herein, devices (including those associated with the data exchange layer 120, business systems 110, 112, and receiver 130) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, an Ethernet network, a wireless LAN network, and/or an Internet Protocol (IP) network such as the Internet, an intranet, or an extranet. Note that any devices described herein may communicate via one or more such communication networks.

The devices of FIG. 1 might, according to some embodiments, be accessible via a Graphical User Interface (GUI). The GUI might be associated with a data exchange layer application and may be used, for example, to dynamically display and receive information in connection with the business files and/or a configuration of business systems 110, 112 and the data exchange layer 120.

Although a single data exchange layer 120 is shown in FIG. 1, any number of such devices may be included. Moreover, various devices described herein might be combined or co-located according to embodiments of the present invention.

The data exchange layer 120 may include a communication device (e.g., a port) to receive data from the plurality of business systems 110, 112 and/or the receiver 130. The data exchange layer 120 may further include a processor coupled to the communication device and a storage device in communication with the processor storing instructions adapted to be executed by the processor to perform a method in accordance with any of the embodiments described herein. For example, the data exchange layer 120 may receive business files from the business systems 110, 112 and forward the files to one or more receivers 130 as appropriate (and, in some cases, receive report files back from the receivers 130). The data exchange layer 120 may also transmit notifications to one or more business systems 110, 112 in connection with the transfer and/or validation of business files.

Figure 2:
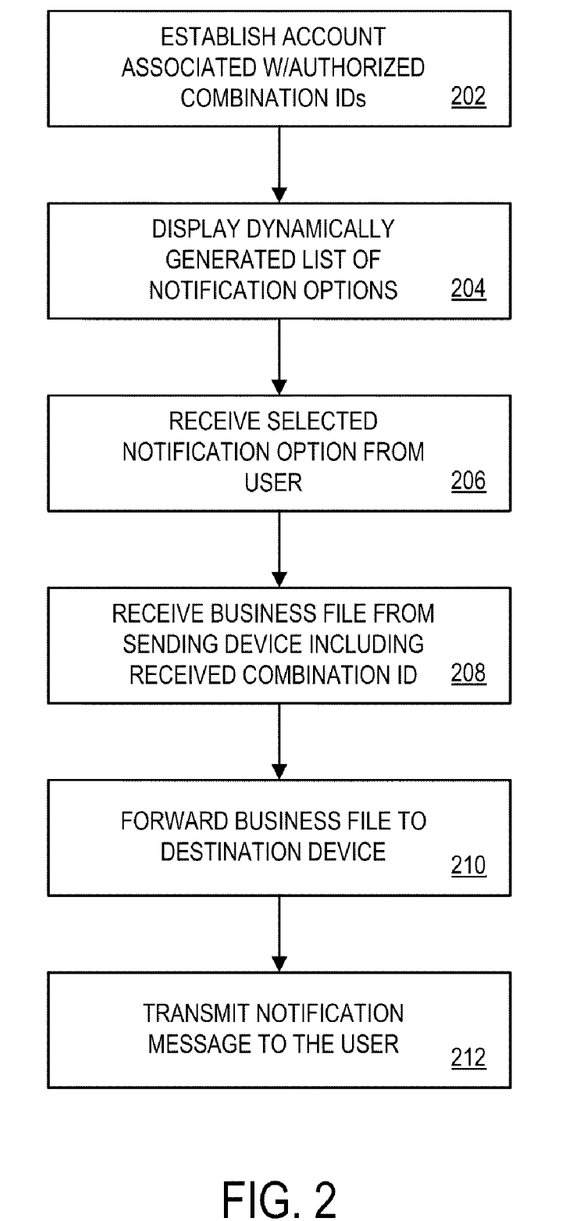
FIG. 2 illustrates a method according to some embodiments of the present invention.

FIG. 2 illustrates one method that might be performed, for example, by the data exchange layer 120 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, an account may be established for a user. The account might be, for example, associated with a user identifier and password. The account may also be, for example, associated with a set of authorized combination identifiers, wherein each authorized combination identifier includes all of (i) an authorized sending device identifier, (ii) an authorized destination device identifier, and (iii) an authorized file type identifier. For example, an authorized combination identifier of "sender123.destination456.fin01" might indicate that the user may transmit business files of the type "fin01" (e.g., financial documents for the year 2011) from a device called "sender123" to remote device called "destination456." According to some embodiments, the account established for the user is further associated with at least one of a user role (e.g., indicating that he or he is a group manager within a particular division of an enterprise) and/or a module access list for the user.

Figure 3:
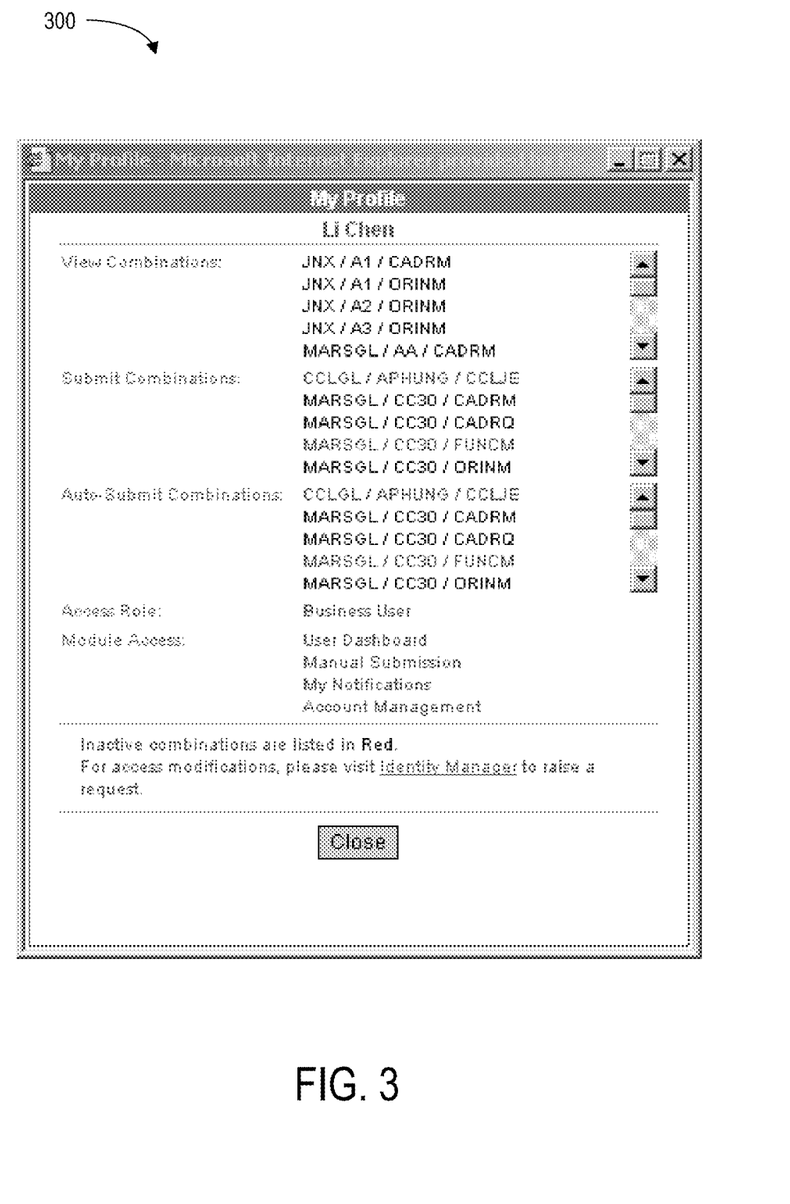
FIG. 3 illustrates a user profile graphical user interface according to some embodiments.

For example, FIG. 3 illustrates a user profile graphical user interface 300 that might be used to establish and/or modify accounts (or profile) for a user according to some embodiments. In particular, the user interface 300 might indicate sets of combinations that can be viewed by a user, be manually submitted by a user, and/or be automatically submitted for the user. The user interface 300 might also indicate the user's current role (e.g., that he or she is "business user") and which modules of the data exchange layer may be accessed in connection with that account (e.g., a user dashboard module and/or a notification module).

Referring again to FIG. 2, at 204 a dynamically generated list of notification options might be displayed to the user, each option being associated with one of the authorized combination identifiers. A notification option might indicate, for example, that the user would receive an email message whenever a particular type of file is sent from a sending device or account to a receiving device or account. At 206, a selected notification option may be received from the user for each of the authorized combination identifiers. That is, a user may be allowed to customize the notifications he or she receives in connection with the data exchange layer. According to some embodiments, the selected notification option is associated with at least one of: (i) a sender, (ii) a receiver, (iii) a data type, (iv) a current enrollment, (v) files submitted by the user, (vi) files submitted by other users, and/or (vii) a user email address.

The data exchange layer may then receive a business file at 208. Moreover, the business file may be received along with a received combination identifier that includes all of (i) a sending device identifier associated with the sending device, (ii) a destination device identifier, and (iii) a file type identifier associated with the business file. The business file may be, for example, a word processing document, a spreadsheet document, a data file, an XML file, a folder, and/or any other type of business information. According to some embodiments, business file is associated a manual upload by the user (e.g., after or she selects the file or folder within a directory), an automated upload process, and/or a standard or secure File Transfer Protocol (FTP) operation. According to some embodiments, an automated validation process is performed for the received business file. For example, the data exchange layer might confirm that all required fields in a document contain valid information, that the number of records within the file is correct, that a hash value matches an expected value, and/or that the information within the document conforms with one or more pre-determined rules.

Based on the received combination identifier, the business file may be forwarded to a destination device associated with the destination device identifier at 210. For example, the data exchange layer might transmit a copy of the business file to a remote business system. At 212, based on the selected notification option associated with the received combination identifier, a notification message may be transmitted to the user. For example, an email message and/or report might be provided to the user indicating the file was successfully forwarded to the proper destinations by the data exchange layer.

Figure 4:
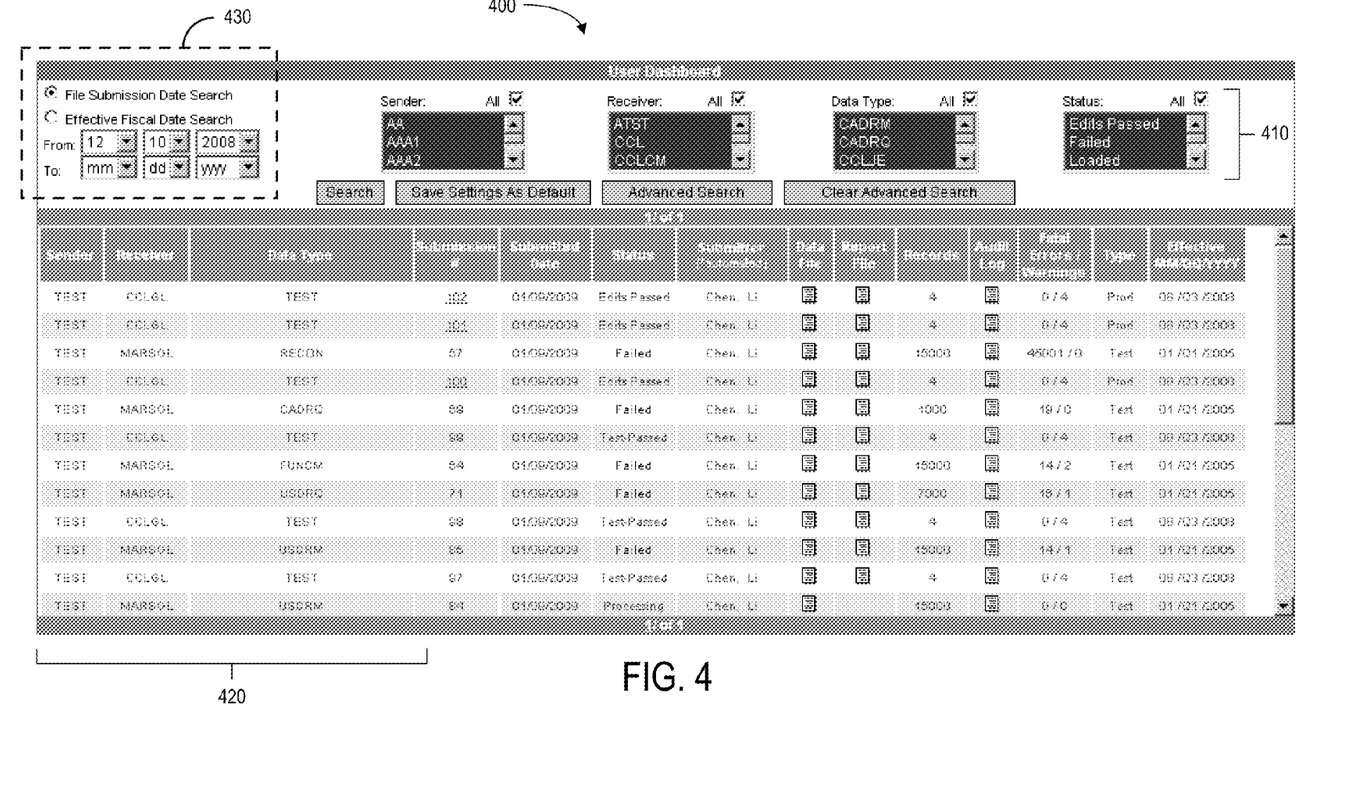
FIG. 4 illustrates a dashboard graphical user interface according to some embodiments.

The data exchange layer may then display information about pending and/or completed file transfers to the user. For example, FIG. 4 illustrates a "dashboard" graphical user interface 400 according to some embodiments of the invention. The user interface 400 may, for example, let a user select one or more senders, receivers, data types and statuses in a selection area 410. Information for each business file that satisfies the selection criteria provided by the user may then be displayed on the dashboard. The displayed information might include, for example, the sender, receiver, and data type of the file, representing a combination identifier 420 of the file. Other displayed information might include, for example, a submission identifier, a submission date, a status (e.g., indicating that the file passed or failed a validation process), a submitter name, a data file indicator (e.g., a link to the original document), a report file indicator, a record length value, an audit log indicator (e.g., a link to a running audit log file), and/or an error indicator (e.g., including whether or note any warnings or fatal errors were generated by a validation process).

The "submission" date might be, for example, the date on which the user transmitted to the business file to the data exchange layer. Note, however, that some business files may have an "effective" date that is different than the submitted date. For example, a document might have an effective date equal to the last day of the previous business quarter (e.g., the financial numbers in the document might represent values as of the close of that quarter). As a result, a date selection area 430 might let a user select documents based on either a submitted date or an effective date as appropriate.

Figure 5:
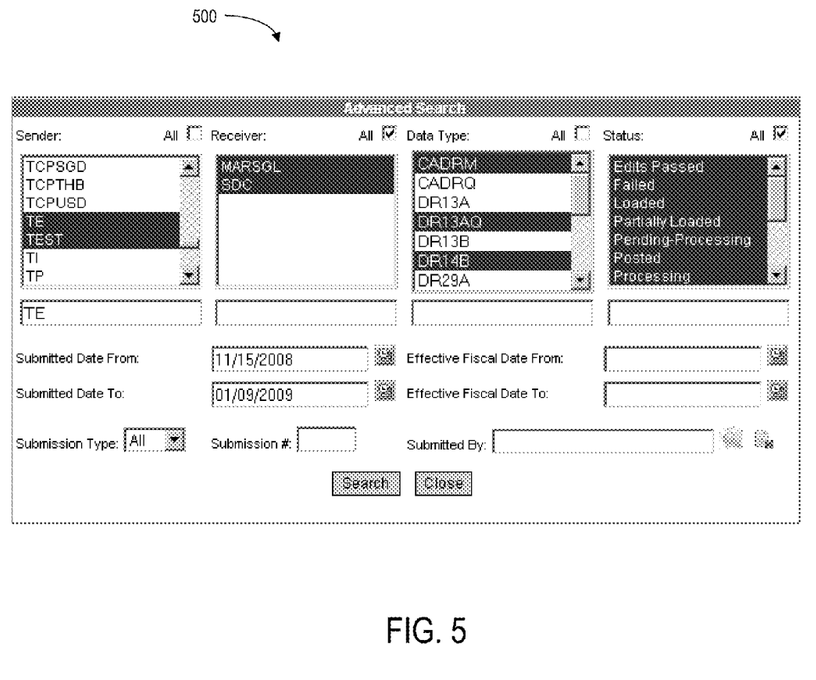
FIG. 5 illustrates a search definition graphical user interface according to some embodiments.

According to some embodiments, the user can activate an "advanced search" icon on the dashboard user interface 400 if he or she is searching for a particular business file. For example, FIG. 5 illustrates a search definition graphical user interface 500 according to some embodiments. In this case, the user might enter particular values for a sender identifier, a receiver identifier, a data type, a status, a submission date, a submission date range, an effective fiscal date, an effective fiscal date range, a submission type, and/or a submission identifier.

Figure 6:
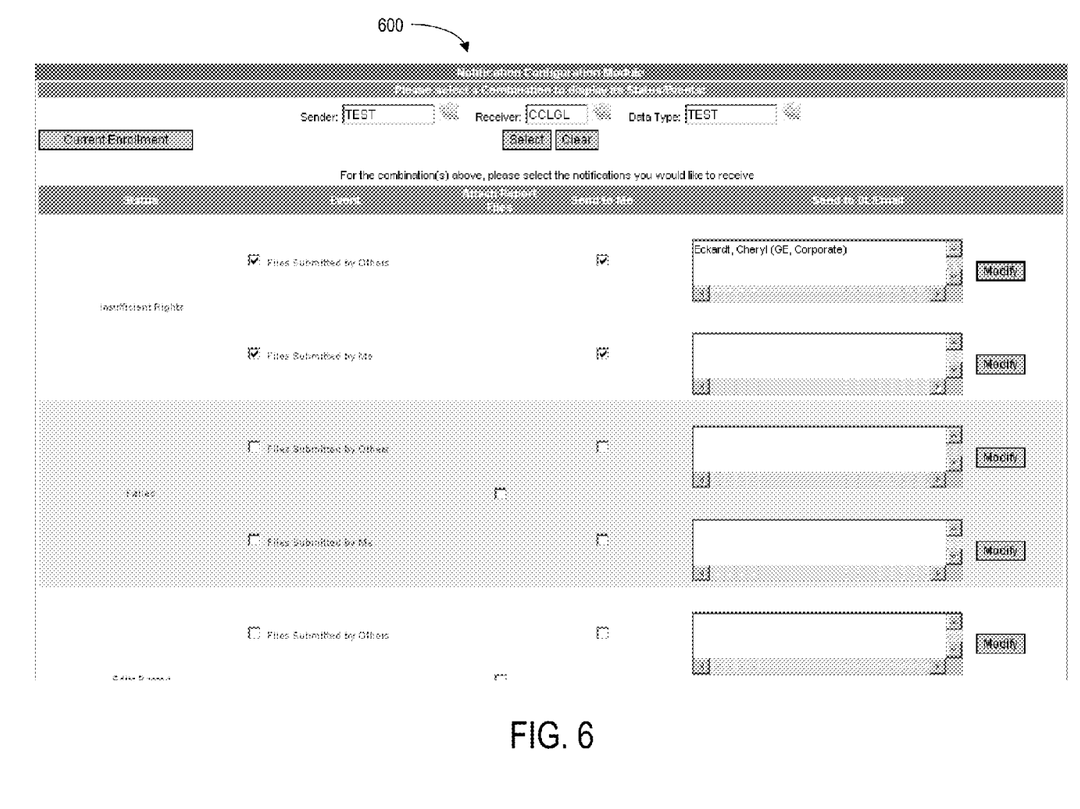
FIG. 6 illustrates a notification options graphical user interface according to some embodiments.

When a file is processed by the data exchange layer, a notification (e.g., an email and/or report) may be transmitted to a user. Moreover, a user may select one or more customized enrollment or subscription options for his or account. For example, FIG. 6 illustrates a notification options graphical user interface 600 according to some embodiments. The user may enter or select a combination identifier (sender, receiver, data type) and receive an indication on the user interface 600 reflecting all notifications to which the user currently subscribes. The indication might include, for example, a status, an event description, an indication as to whether or not a report should be attached an email notification, and a communication address indicating where the notification should be sent. Note that the data exchange layer could be configured to send notifications to multiple addresses.

Figure 7:
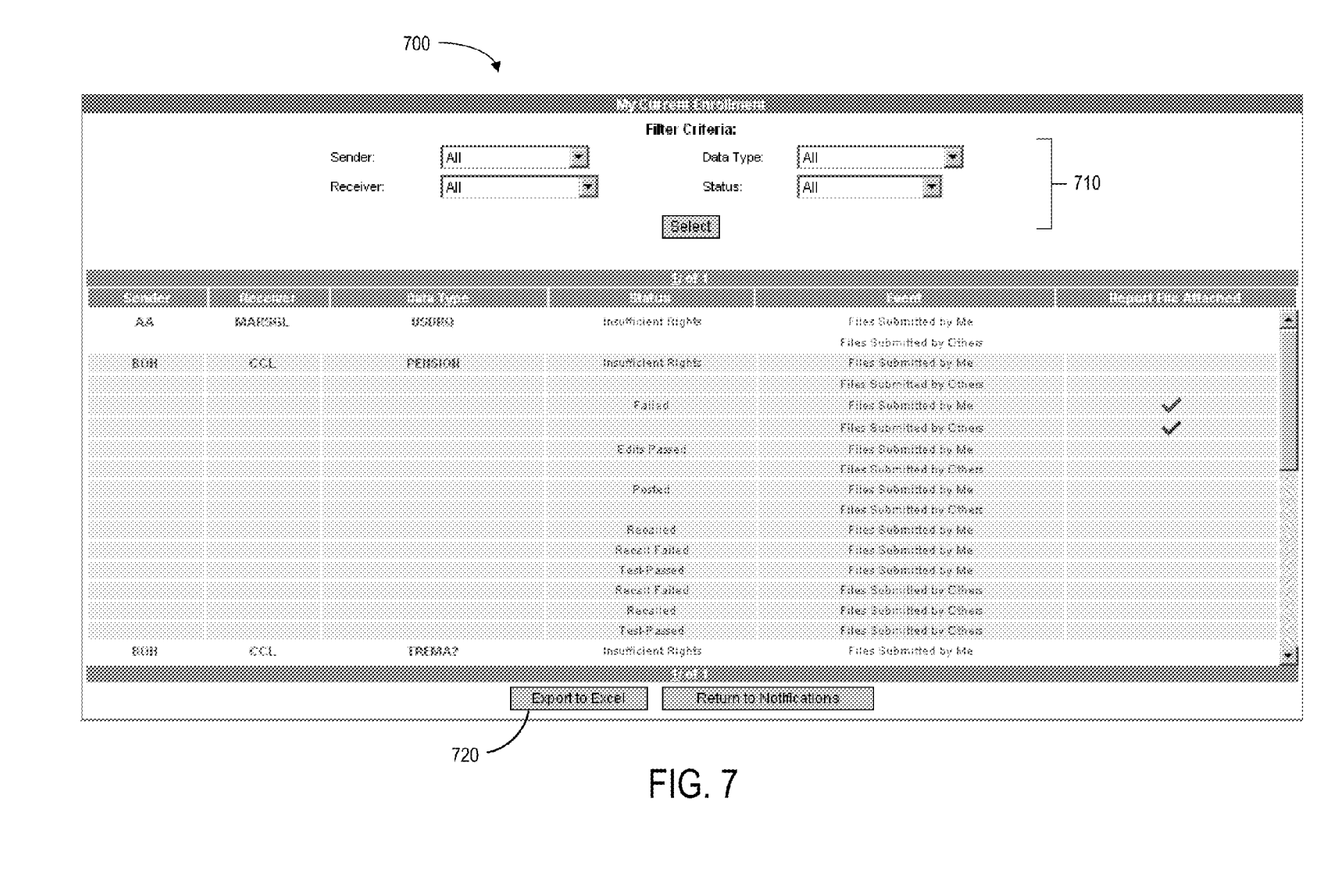
FIG. 7 illustrates an enrollment graphical user interface according to some embodiments.

According to some embodiments, a user may enroll to receive certain types of notification. For example, FIG. 7 illustrates an enrollment graphical user interface 700 according to some embodiments. The user interface 700 may include a selection area 710 where a user can enter or select a sender, a receiver, a data type, and/or a status. Based on these filter parameters, current enrollment information may be displayed, such as a sender, a receiver, a data type, a status, an event description, and/or an indication of a report attachment (e.g., the report might explain why a particular file failed a validation process). According to some embodiments, a user may select an "export" icon 720 to request that the enrollment information be exported to a spreadsheet application.

Figure 8:
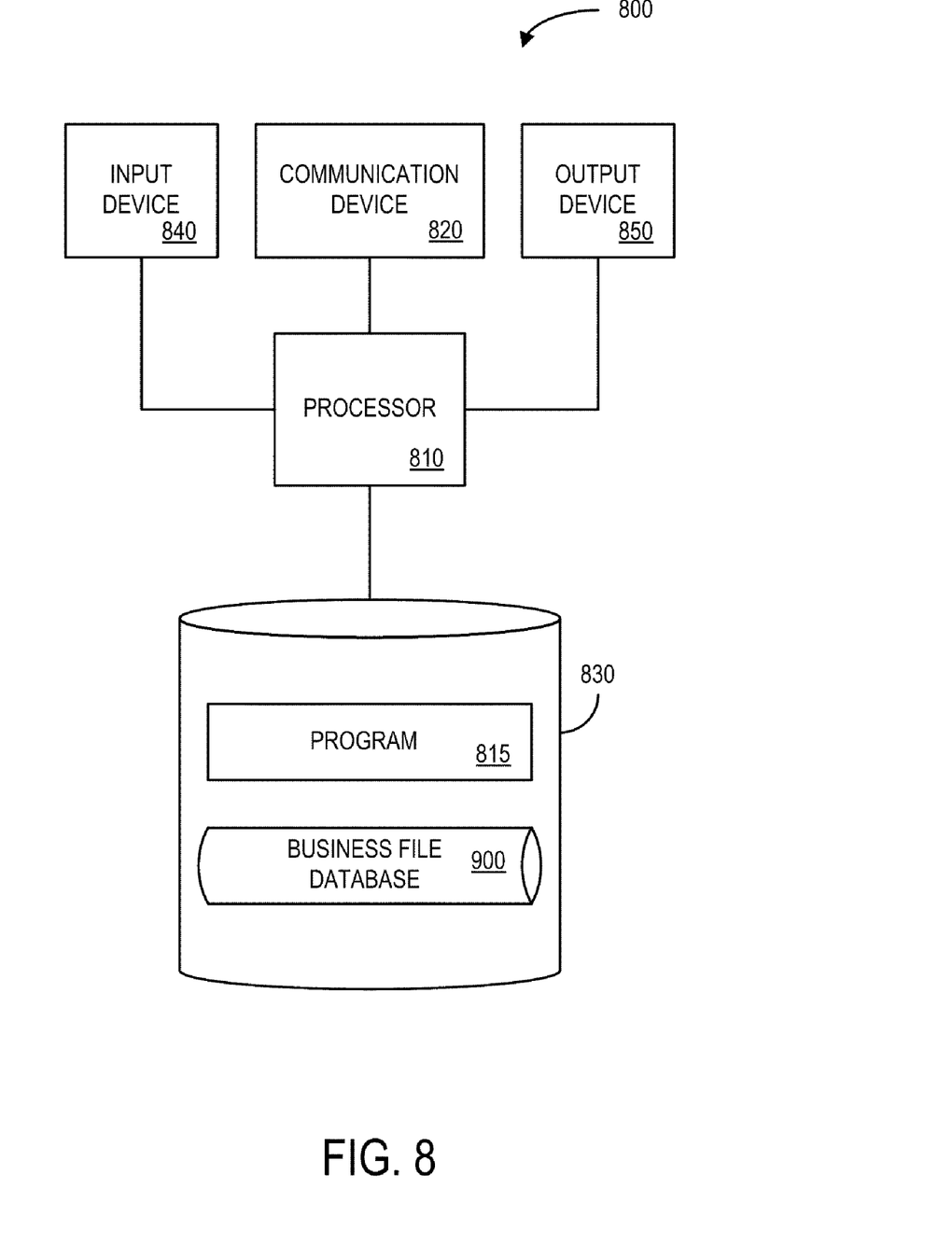
FIG. 8 is a block diagram of a data exchange layer apparatus in accordance with some embodiments of the present invention.

FIG. 8 is a block diagram of a data exchange layer apparatus 800 in accordance with some embodiments of the present invention. The apparatus 800 might, for example, comprise a platform or engine similar to the data exchange layer 120 illustrated in FIG. 1. The apparatus 800 comprises a processor 810, such as one or more INTEL® Pentium® processors, coupled to a communication device 820 configured to communicate via a communication network (not shown in FIG. 8). The communication device 820 may be used to exchange information with remote business systems and destination devices.

The processor 810 is also in communication with an input device 840. The input device 840 may comprise, for example, a keyboard, a mouse, or computer media reader. Such an input device 840 may be used, for example, to enter configuration and/or management information about user accounts and/or notifications. The processor 810 is also in communication with an output device 850. The output device 850 may comprise, for example, a display screen or printer. Such an output device 850 may be used, for example, to provide reports and/or display information associated with user accounts, notifications, and business files that have been (or will be) exchanged.

The processor 810 is also in communication with a storage device 830. The storage device 830 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices. The storage device 830 stores a program 815 for controlling the processor 810. The processor 810 performs instructions of the program 85, and thereby operates in accordance any embodiments of the present invention described herein. For example, the processor 810 may establish an account for a user, the account being associated with a set of authorized combination identifiers, wherein each authorized combination identifier includes all of (i) an authorized sending device identifier, (ii) an authorized destination device identifier, and (iii) an authorized file type identifier. The processor 810 may also, according to some embodiments, display to the user a dynamically generated list of notification options, each option being associated with one of the authorized combination identifiers and receive from the user a selected notification option for each of the authorized combination identifiers.

The processor 810 may also receive, from a sending device via the communication device 820, a business file, wherein the business file is received along with a received combination identifier that includes all of (i) a sending device identifier associated with the sending device, (ii) a destination device identifier, and (iii) a file type identifier associated with the business file. According to some embodiments, the processor 810 may, based on the received combination identifier, forward, via the communication device, the business file to a destination device associated with the destination device identifier. Based on the selected notification option associated with the received combination identifier, the processor 810 may arrange to transmit a notification message to the user.

As used herein, information may be "received" by or "transmitted" to, for example: (i) the data exchange layer apparatus 800 from other devices; or (ii) a software application or module within the data exchange layer apparatus 800 from another software application, module, or any other source.

As shown in FIG. 8, the storage device 830 also stores the business file database 900. One example of such a database 900 that may be used in connection with the data exchange layer apparatus 800 will now be described in detail with respect to FIG. 9. The illustration and accompanying descriptions of the database presented herein are exemplary, and any number of other database arrangements could be employed besides those suggested by the figures. For example, different databases associated with different types of intelligent electronic devices might be stored at the apparatus 800.

Figure 9:
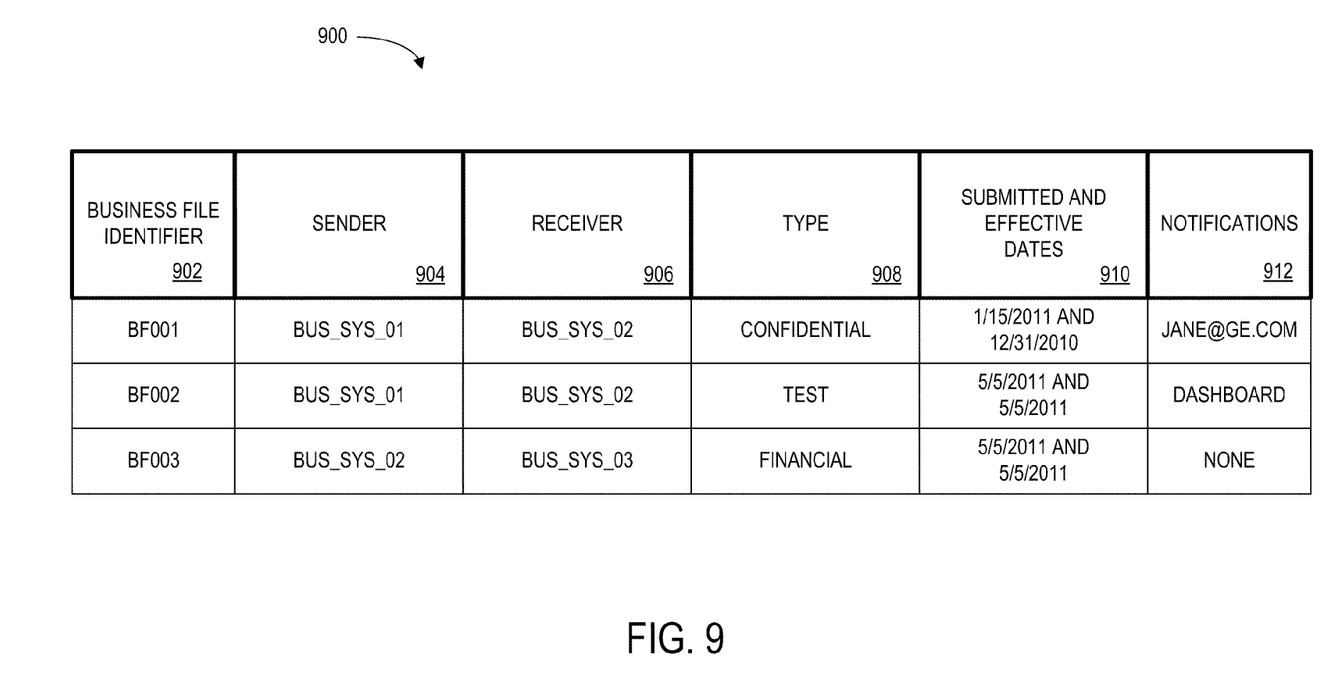
FIG. 9 is a tabular view of a portion of a business file database in accordance with some embodiments of the present invention.

FIG. 9 is a tabular view of a portion of the business file database 900 in accordance with some embodiments of the present invention. The table includes entries associated with intelligent electronic devices. The table also defines fields 902, 904, 906, 908, 910, 912 for each of the entries. The fields specify: a business file identifier 902, a sender 904, a receiver 906, a type 908, submitted and effective dates 910, and notifications 912. The information in the database 900 may be periodically created and updated based on information received from intelligent electronic devices and/or a central server.

The business file identifier 902 might be, for example, an alphanumeric code that uniquely identifies a particular business file that has been (or will) processed in connection with a business data exchange layer. The sender 904, receiver 906, and type 908 might represent, for example, the "combination identifier" associated with the business file. According to some embodiments, the business file identifier 902, sender 904, receiver 906, and/or type 908 might provide unique identification for accounts (e.g., user accounts) associated with system-to-system automated data feeds.

The submitted and effective dates 910 might indicate, respectively, a date (and, in some embodiments, a time) when a file was received by a data exchange layer and a date associated with the information contained within the business file. The notifications 912 might indicate, for example, one or more email addresses that should receive a notification (e.g., when a file transfer fails or completes). Note that according to some embodiments, notifications may be provided to a user via a dashboard user interface (e.g., in addition to or instead of an email notification).

As a result of the embodiments described herein, the efficiency and accuracy associated with the transfer of business information and files may be improved for an enterprise. Moreover, embodiments may facilitate compliance with respect to generally accepted interface controls and standards. For example, a data exchange layer might facilitate compliance with US Sarbanes Oxley IT 404 checklists and/or certifications.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and apparatus described herein may be split, combined, and/or handled by external systems).

Applicants have discovered that embodiments described herein may be particularly useful in connection with business files, although embodiments may be used in connection other types of systems, such as human resources information, shipping information, and/or customer transaction information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A data exchange layer apparatus, comprising:
a communication device to receive data;
a processor coupled to the communication device; and
a storage device in communication with said processor and storing instructions adapted to be executed by said processor to:
establish an account for a user, the account being associated with a set of authorized combination identifiers, wherein each authorized combination identifier includes all of (i) an authorized sending device identifier, (ii) an authorized destination device identifier, and (iii) an authorized file type identifier, wherein the set includes a first authorized combination identifier having a first authorized sending device identifier, a first authorized destination device identifier, and a first authorized file type identifier,
receive from the user, via a notification configuration module graphical user interface, an indication of the first authorized sending device identifier, an indication of the first authorized destination device identifier, and an indication of the first authorized file type identifier,
display to the user, via the notification configuration module graphical user interface, a dynamically generated list of notification options that may be associated with the first authorized combination identifier,
receive from the user, via the notification configuration module graphical user interface, a first selected notification option for the first authorized combination identifier,
receive, from a sending device via the communication device, a business file, wherein the business file is received along with a received combination identifier that includes all of (i) a sending device identifier associated with the sending device, (ii) a destination device identifier, and (iii) a file type identifier associated with the business file,
automatically determine a match between the received combination identifier and the first authorized combination identifier when: (i) the sending device identifier is associated with the first authorized sending device identifier, (ii) the destination device identifier is associated with the first authorized destination device identifier, and (iii) the file type identifier associated with the business file is the first authorized file type identifier,
after the match is determined, forward, via the communication device, the business file to a destination device associated with the destination device identifier, and
after the match is determined, transmit a notification message to the user based on the first selected notification option associated with the first authorized combination identifier.

2. The apparatus of claim 1, wherein the business file is associated with at least one of: (i) a manual upload by the user, (ii) an automated upload process, or (iii) a file transfer protocol operation.

3. The apparatus of claim 1, wherein an automated validation process is performed for the received business file.

4. The apparatus of claim 1, wherein the account is further associated with at least one of: (i) a user role, or (ii) a module access list for the user.

5. The apparatus of claim 1, wherein a user dashboard may be displayed to the user, the user dashboard indicating at least one of: (i) a sender, (ii) a receiver, (iii) a data type, (iv)

submission identifier, (v) a submission date, (vi) a status, (vii) a submitter name, (viii) a data file indicator, (ix) a report file indicator, (x) a record length value, (xi) an audit log indicator, (xii) an error indicator, or (xiii) an effective fiscal date associated with the business file.

6. The apparatus of claim 1, wherein information about the business file may be subsequently located via a user search.

7. The apparatus of claim 6, wherein the user search my include at least one of: (i) a sender identifier, (ii) a receiver identifier, (iii) a data type, (iv) a status, (v) a submission date, (vi) a submission date range, (vii) an effective fiscal date, or (viii) an effective fiscal date range.

8. The apparatus of claim 1, wherein the first selected notification option is associated with at least one of: (i) a sender, (ii) a receiver, (iii) a data type, (iv) a current enrollment, (v) files submitted by the user, (vi) files submitted by other users, or (vii) a user email address.

9. The apparatus of claim 1, wherein current enrollment information is displayed to the user.

10. The apparatus of claim 9, wherein the current enrollment information includes at least one of: (i) a sender, (ii) a receiver, (iii) a data type, (iv) a status, (v) an event, or (vi) an indication of a report attachment.

11. The apparatus of claim 10, wherein the current enrollment information is exported in a spreadsheet application format.

12. A computer-implemented method, comprising:
    establishing an account for a user, the account being associated with a set of authorized combination identifiers, wherein each authorized combination identifier includes all of (i) an authorized sending device identifier, (ii) an authorized destination device identifier, and (iii) an authorized file type identifier, wherein the set includes a first authorized combination identifier having a first authorized sending device identifier, a first authorized destination device identifier, and a first authorized file type identifier;
    receiving from the user, via a notification configuration module graphical user interface, an indication of the first authorized sending device identifier, an indication of the first authorized destination device identifier, and an indication of the first authorized file type identifier;
    displaying to the user, via the notification configuration module graphical user interface, a dynamically generated list of notification options that may be associated with the first authorized combination identifier;
    receiving from the user, via the notification configuration module graphical user interface, a first selected notification option for the first authorized combination identifier;
    receiving, from a sending device via the communication device, a business file, wherein the business file is received along with a received combination identifier that includes all of (i) a sending device identifier associated with the sending device, (ii) a destination device identifier, and (iii) a file type identifier associated with the business file;
    automatically determining a match between the received combination identifier and the first authorized combination identifier when: (i) the sending device identifier is associated with the first authorized sending device identifier, (ii) the destination device identifier is associated with the first authorized destination device identifier, and (iii) the file type identifier associated with the business file is the first authorized file type identifier;
    after the match is determined, automatically forwarding, by a processor, the business file to a destination device associated with the destination device identifier; and
    after the match is determined, transmitting a notification message to the user based on the first selected notification option associated with the first authorized combination identifier.

13. The method of claim 12, wherein the business file is associated with at least one of: (i) a manual upload by the user, (ii) an automated upload process, or (iii) a file transfer protocol operation.

14. The method of claim 12, wherein an automated validation process is performed for the received business file.

15. The method of claim 12, wherein the account is further associated with at least one of: (i) a user role, or (ii) a module access list for the user.

16. The method of claim 12, wherein a user dashboard may be displayed to the user, the user dashboard indicating at least one of: (i) a sender, (ii) a receiver, (iii) a data type, (iv) submission identifier, (v) a submission date, (vi) a status, (vii) a submitter name, (viii) a data file indicator, (ix) a report file indicator, (x) a record length value, (xi) an audit log indicator, (xii) an error indicator, or (xiii) an effective fiscal date associated with the business file.

17. A non-transitory computer-readable medium storing instructions adapted to be executed by a processor to perform a method, said method comprising:
    establishing an account for a user, the account being associated with a set of authorized combination identifiers, wherein each authorized combination identifier includes all of (i) an authorized sending device identifier, (ii) an authorized destination device identifier, and (iii) an authorized file type identifier, wherein the set includes a first authorized combination identifier having a first authorized sending device identifier, a first authorized destination device identifier, and a first authorized file type identifier;
    receiving from the user, via a notification configuration module graphical user interface, an indication of the first authorized sending device identifier, an indication of the first authorized destination device identifier, and an indication of the first authorized file type identifier;
    displaying to the user, via the notification configuration module graphical user interface, a dynamically generated list of notification options that may be associated with the first authorized combination identifier;
    receiving from the user, via the notification configuration module graphical user interface, a first selected notification option for the first authorized combination identifier
    receiving, from a sending device via the communication device, a business file, wherein the business file is received along with a received combination identifier that includes all of (i) a sending device identifier associated with the sending device, (ii) a destination device identifier, and (iii) a file type identifier associated with the business file;
    automatically determining a match between the received combination identifier and the first authorized combination identifier when: (i) the sending device identifier is associated with the first authorized sending device identifier, (ii) the destination device identifier is associated with the first authorized destination device identifier, and (iii) the file type identifier associated with the business file is the first authorized file type identifier;

after the match is determined, automatically forwarding, by a processor, the business file to a destination device associated with the destination device identifier; and after the match is determined, transmitting a notification message to the user based on the first selected notification option associated with the first authorized combination identifier.

18. The medium of claim 17, wherein information about the business file may be subsequently located via a user search.

19. The medium of claim 18, wherein the user search my include at least one of: (i) a sender identifier, (ii) a receiver identifier, (iii) a data type, (iv) a status, (v) a submission date, (vi) a submission date range, (vii) an effective fiscal date, or (viii) an effective fiscal date range.

20. The medium of claim 17, wherein the first selected notification option is associated with at least one of: (i) a sender, (ii) a receiver, (iii) a data type, (iv) a current enrollment, (v) files submitted by the user, (vi) files submitted by other users, or (vii) a user email address.

\* \* \* \* \*